(12) United States Patent
Wilson, III et al.

(10) Patent No.: US 10,337,474 B1
(45) Date of Patent: Jul. 2, 2019

(54) AIR INTAKE SYSTEM

(71) Applicant: Honda Motor Co., Ltd., Tokyo (JP)

(72) Inventors: Robert T. Wilson, III, Delaware, OH (US); Russell A. Diehl, Dublin, OH (US); Zeile A. Klaiss, Powell, OH (US); Jacob O. Borth, Olathe, KS (US); Jason W. Grundey, Wapakoneta, OH (US); Dane R. Marsack, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/936,810

(22) Filed: Mar. 27, 2018

(51) Int. Cl.
| *F02M 35/10* | (2006.01) |
| *B60K 13/02* | (2006.01) |
| *F02M 35/04* | (2006.01) |
| *F02M 35/16* | (2006.01) |

(52) U.S. Cl.
CPC ....... *F02M 35/10013* (2013.01); *B60K 13/02* (2013.01); *F02M 35/048* (2013.01); *F02M 35/10321* (2013.01); *F02M 35/162* (2013.01)

(58) Field of Classification Search
CPC ........... F02M 35/10013; F02M 35/162; F02M 35/048; F02M 35/10321; B60K 13/02
See application file for complete search history.

(56) References Cited

U.S. PATENT DOCUMENTS

| 5,195,484 A * | 3/1993 | Knapp | F02M 35/10013 123/198 E |
| 5,794,733 A | 8/1998 | Stoel et al. | |
| 6,622,806 B1 | 9/2003 | Matsuura | |
| 7,168,516 B2 | 1/2007 | Nozaki et al. | |
| 8,434,580 B2 * | 5/2013 | Azuma | F02M 35/162 180/291 |
| 8,479,854 B1 * | 7/2013 | Gagnon | B60K 26/04 180/68.3 |
| 8,567,847 B1 * | 10/2013 | King | B60K 13/02 180/68.3 |
| 8,960,347 B2 | 2/2015 | Bennett | |
| 9,446,796 B2 | 9/2016 | Nozaki et al. | |
| 2004/0195019 A1 * | 10/2004 | Kato | B60K 13/02 180/68.3 |
| 2004/0231900 A1 * | 11/2004 | Tanaka | B60K 13/02 180/68.3 |

(Continued)

FOREIGN PATENT DOCUMENTS

GB 2529905 A 3/2016

*Primary Examiner* — Erez Gurari
(74) *Attorney, Agent, or Firm* — Honda Patents & Technologies North America, LLC; Mark E. Duell (57) ABSTRACT

An air intake system for a motor vehicle is disclosed. The motor vehicle has a frame and a body on the frame. The frame and the body define a passenger cabin and an engine compartment longitudinally rearward of the passenger cabin. A firewall separates the passenger cabin and the engine compartment. An engine is attached to the frame in the engine compartment, and wheels are driven by the engine. The air intake system includes an air intake snorkel for providing air to the engine, a first vent in the body for directing air to the air intake snorkel, a second vent in the body for directing air to the air intake snorkel, a flexible member installed around the air intake snorkel for isolating the air intake snorkel from the engine compartment, and a compartment floor isolating the air intake snorkel from the wheels.

14 Claims, 9 Drawing Sheets

(56) References Cited

U.S. PATENT DOCUMENTS

| | | | |
|---|---|---|---|
| 2006/0065231 A1* | 3/2006 | Nozaki | B60K 13/02 123/198 E |
| 2007/0227793 A1* | 10/2007 | Nozaki | B60K 13/02 180/68.3 |
| 2008/0282654 A1* | 11/2008 | Matschl | B01D 46/0015 55/385.3 |
| 2008/0289896 A1* | 11/2008 | Kosuge | B60K 11/06 180/312 |
| 2010/0078240 A1* | 4/2010 | Miura | B60K 13/02 180/68.3 |
| 2010/0078256 A1* | 4/2010 | Kuwabara | B60K 5/02 180/337 |
| 2010/0236852 A1* | 9/2010 | Shiratori | B60K 13/02 180/68.3 |
| 2011/0132678 A1* | 6/2011 | Nakamura | B62D 21/186 180/68.3 |
| 2012/0031693 A1* | 2/2012 | Deckard | B60K 17/08 180/68.3 |
| 2013/0033070 A1* | 2/2013 | Kinsman | B62D 21/183 296/190.03 |
| 2013/0087396 A1* | 4/2013 | Itoo | B60K 11/08 180/68.3 |
| 2015/0047917 A1* | 2/2015 | Burt, II | B62D 25/2036 180/292 |
| 2015/0251720 A1* | 9/2015 | Nishimura | B60K 13/02 180/219 |
| 2016/0318387 A1 | 11/2016 | Kuhn et al. | |
| 2017/0001549 A1* | 1/2017 | Bessho | B60K 13/04 |
| 2017/0029035 A1* | 2/2017 | Dube | B60K 15/063 |
| 2018/0222311 A1* | 8/2018 | Toupin | F16H 57/0475 |
| 2018/0298856 A1* | 10/2018 | Mackenzie | F02M 35/161 |

* cited by examiner

AIR INTAKE SYSTEM

TECHNICAL FIELD

The embodiments described herein are related to air intake systems for motor vehicles, such as those known as side-by-side utility vehicles.

BACKGROUND

In the past, air intake systems for motor vehicles such as side-by-side utility vehicles, with rear-placed engines used a ducted air intake covered by a water resistant membrane as a pre-filter. While the membrane would reduce the amount of water and debris that may enter the intake system, the membrane could be clogged, preventing air from entering the air intake. Therefore, there is a need for an air intake system that prevents air and debris from entering the air intake system that is less likely to be blocked and has fewer parts.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, an air intake system for a motor vehicle is disclosed. The motor vehicle has a frame, a body on the frame, a first portion of the frame and the body defining a passenger cabin, a second portion of the frame and the body defining an engine compartment longitudinally rearward of the passenger cabin, a firewall separating the passenger cabin and the engine compartment, an engine attached to the frame in the engine compartment, wheels driven by the engine, and a bed located longitudinally rearward of the passenger cabin and vertically above the engine compartment. The air intake system includes an air intake snorkel for providing air to the engine, a first vent in the body for directing air to the air intake snorkel, a flexible member for isolating the air intake snorkel from the engine compartment, and a compartment floor isolating the air intake snorkel from the wheels.

According to another aspect, an air cleaner device in a motor vehicle is disclosed wherein right and left seats are mounted to a body frame, an engine is disposed longitudinally rearward of the seats, and the air cleaner device is disposed between the engine and the seats to supply outside air to the engine. The air cleaner device includes an air cleaner body containing an air cleaner element, and a snorkel connected to the air cleaner body to introduce the outside air into the air cleaner body, wherein the snorkel extends laterally from the air cleaner body toward a side of the motor vehicle.

According to yet another aspect, an air intake system for a motor vehicle is disclosed. The motor vehicle has a frame, a body on the frame, a first portion of the frame and the body defining a passenger cabin, a second portion of the frame and the body defining an engine compartment longitudinally rearward of the passenger cabin, a firewall separating the passenger cabin and the engine compartment, an engine attached to the frame in the engine compartment, wheels driven by the engine, and a bed located longitudinally rearward of the passenger cabin and vertically above the engine compartment. The air intake system includes an air intake snorkel for providing air to the engine, a first vent in the body for directing air to the air intake snorkel, a second vent in the body for directing air to the air intake snorkel, a flexible member installed around the air intake snorkel for isolating the air intake snorkel from the engine compartment, and a compartment floor isolating the air intake snorkel from the wheels.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
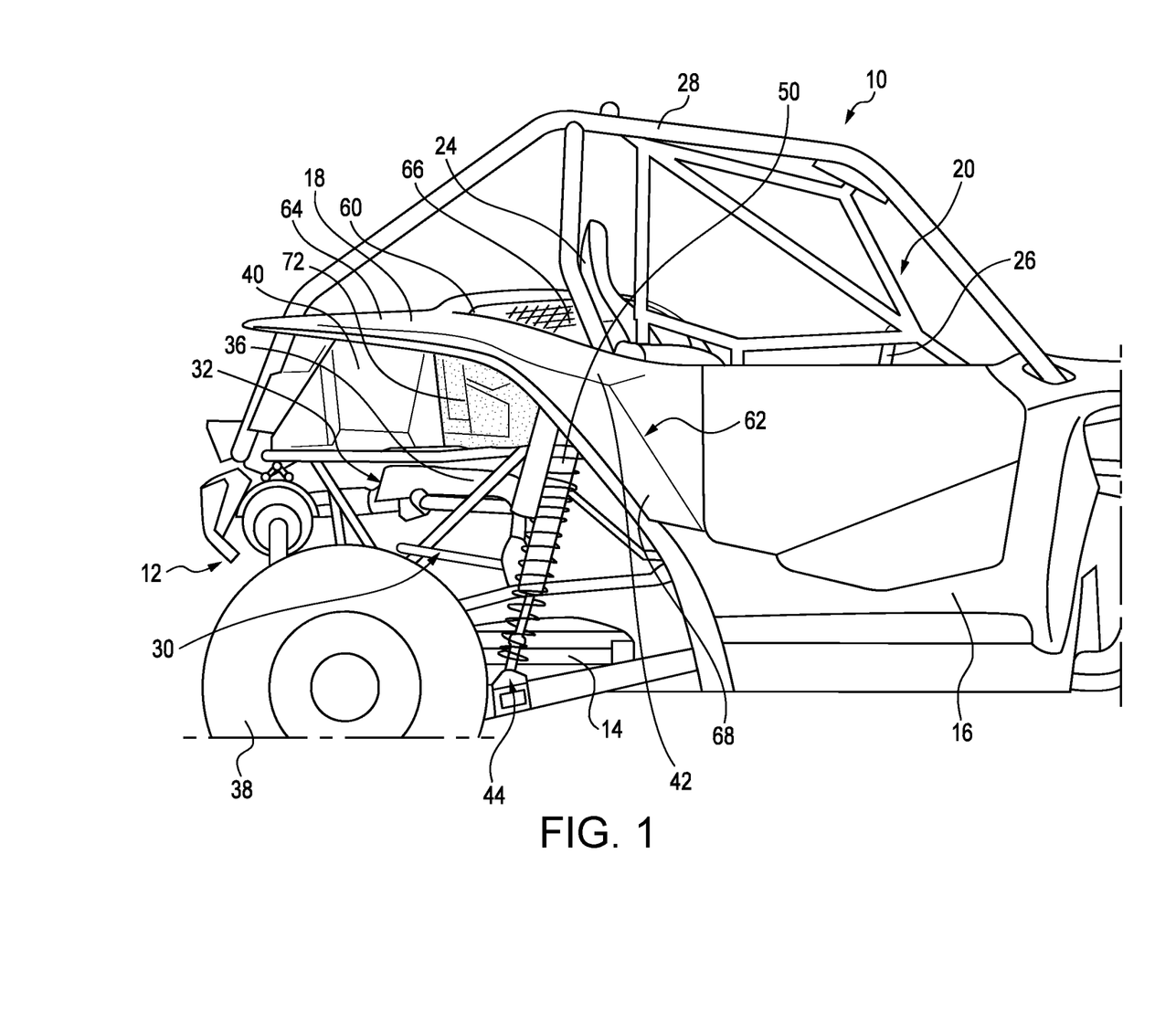
FIG. 1 is a side view of a rear quarter of an embodiment of a motor vehicle.
Figure 2:
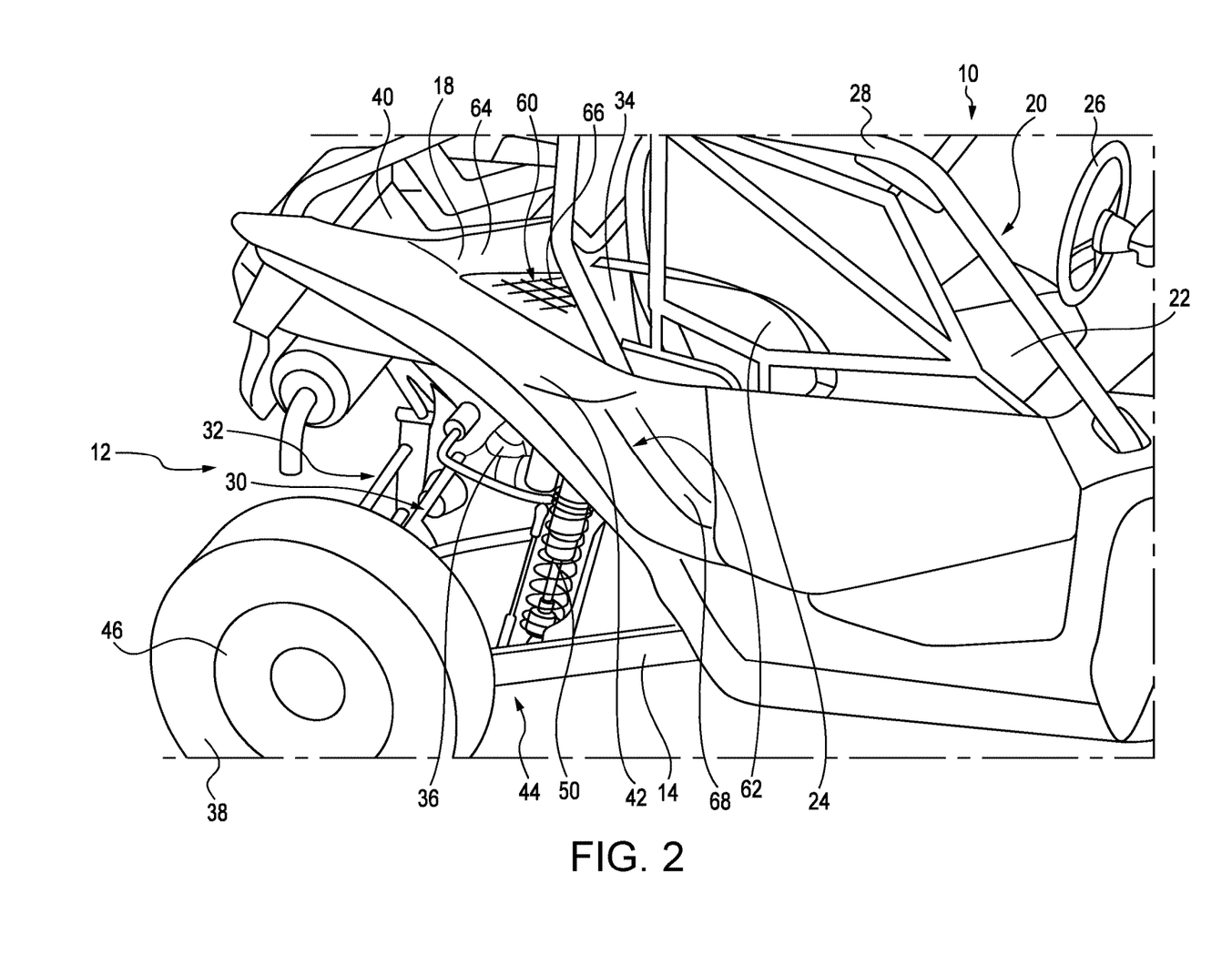
FIG. 2 is a top perspective view of the rear quarter of the motor vehicle.
Figure 3:
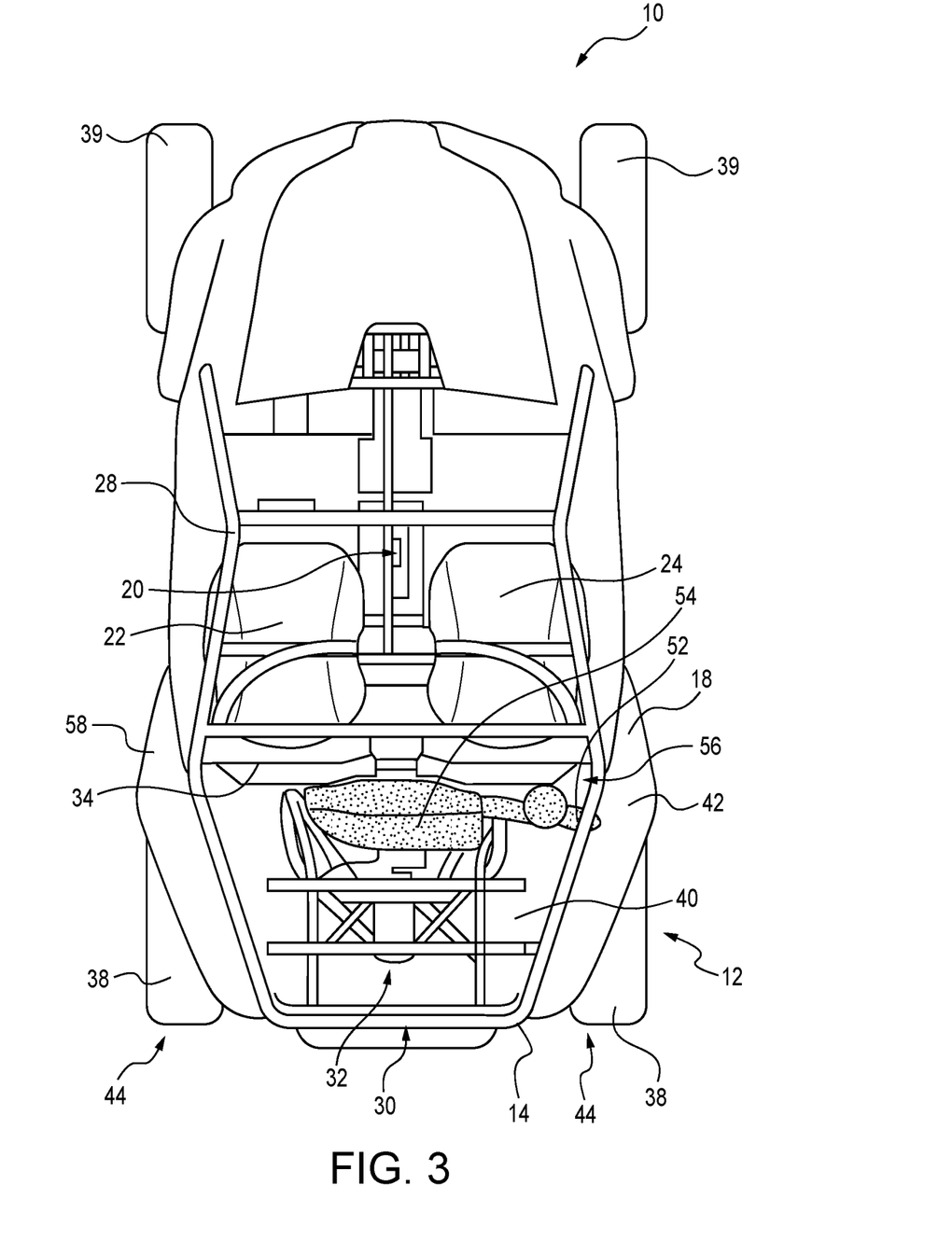
FIG. 3 is a top view of the motor vehicle with a bed, a left rear quarter panel, and a right rear quarter panel illustrated transparently.
Figure 4:
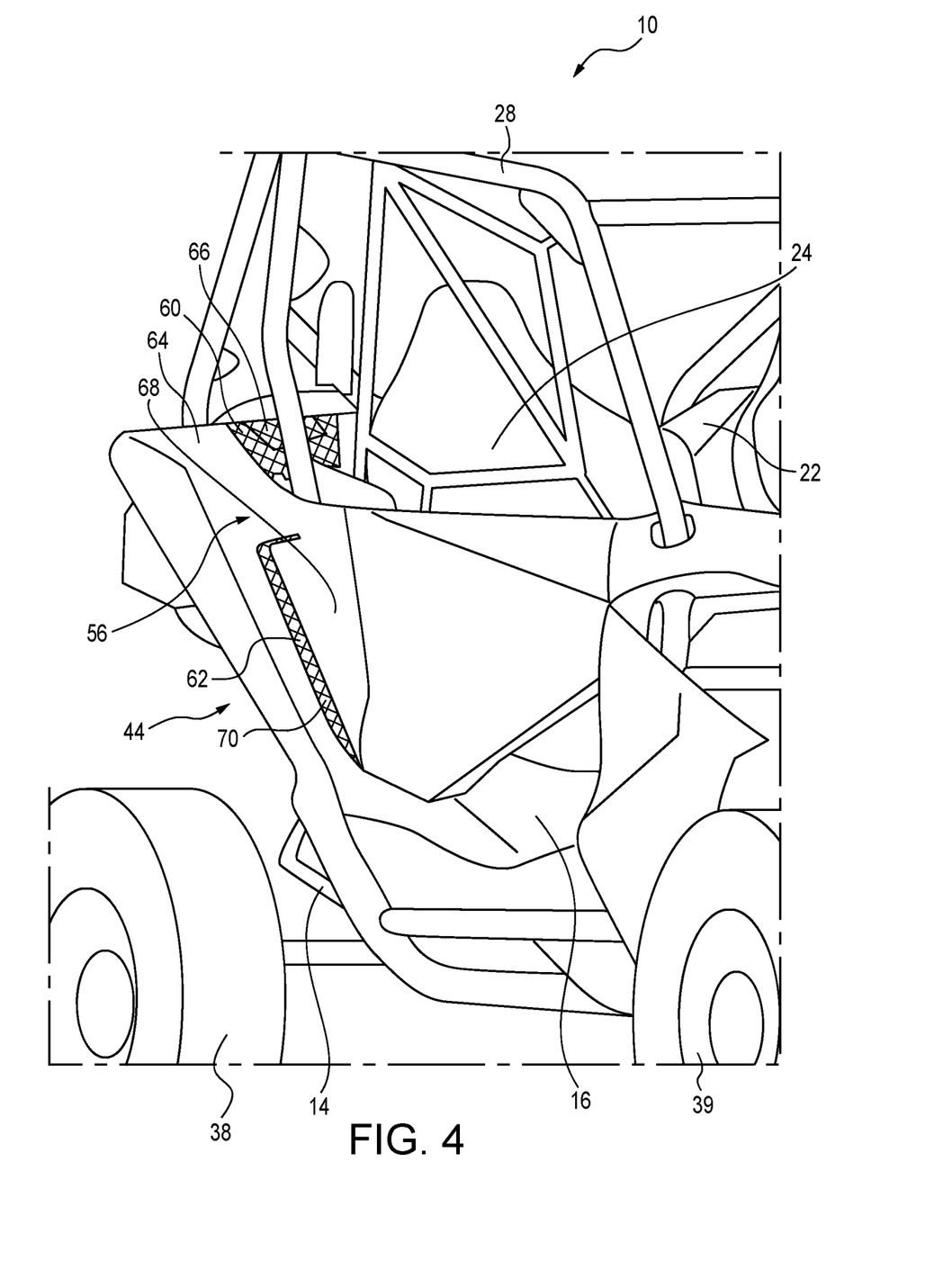
FIG. 4 is front perspective view of a portion of the motor vehicle showing the right rear quarter panel.
Figure 5:
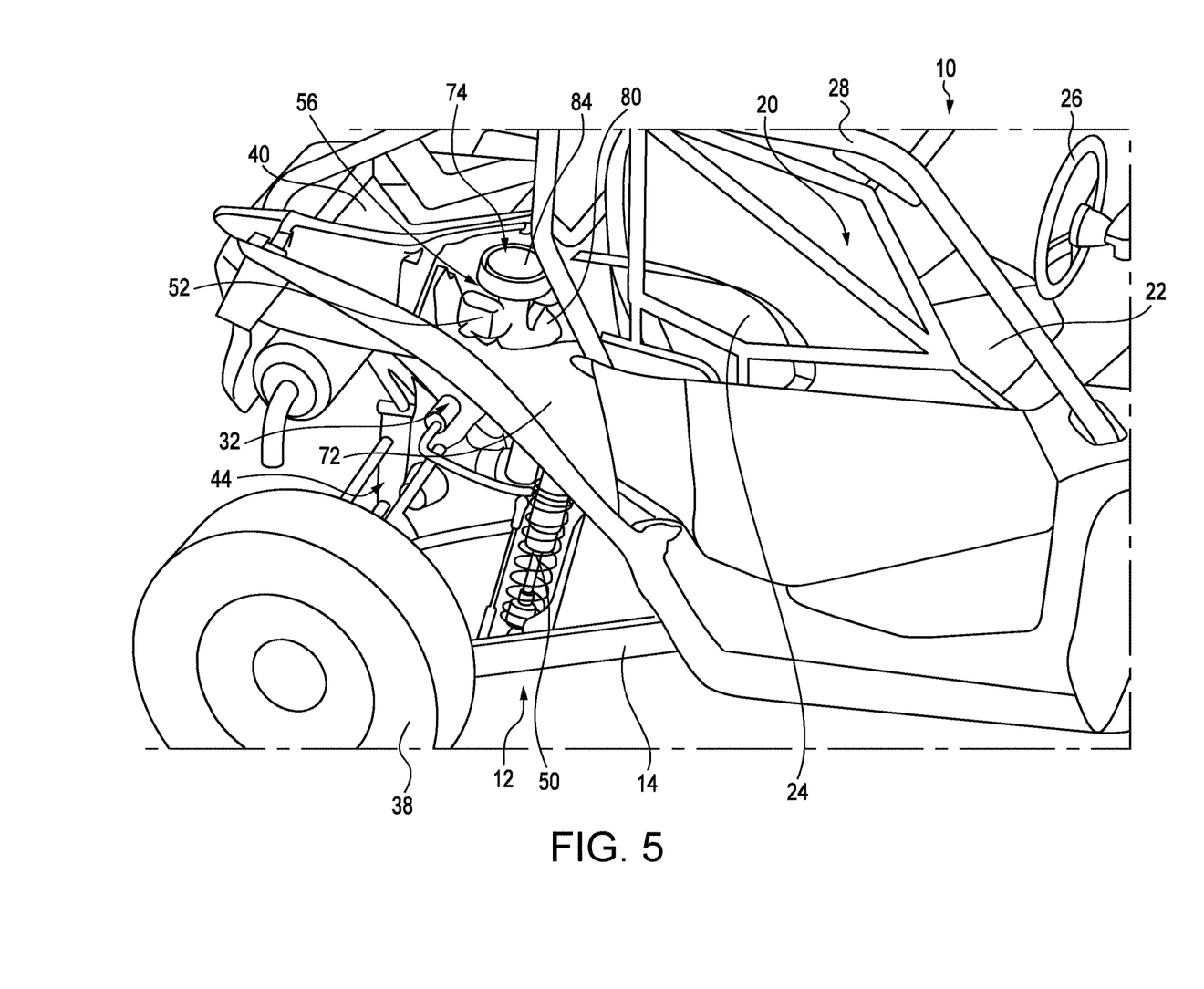
FIG. 5 is a top perspective view of the rear quarter of the motor vehicle with the right rear quarter panel removed.
Figure 6:
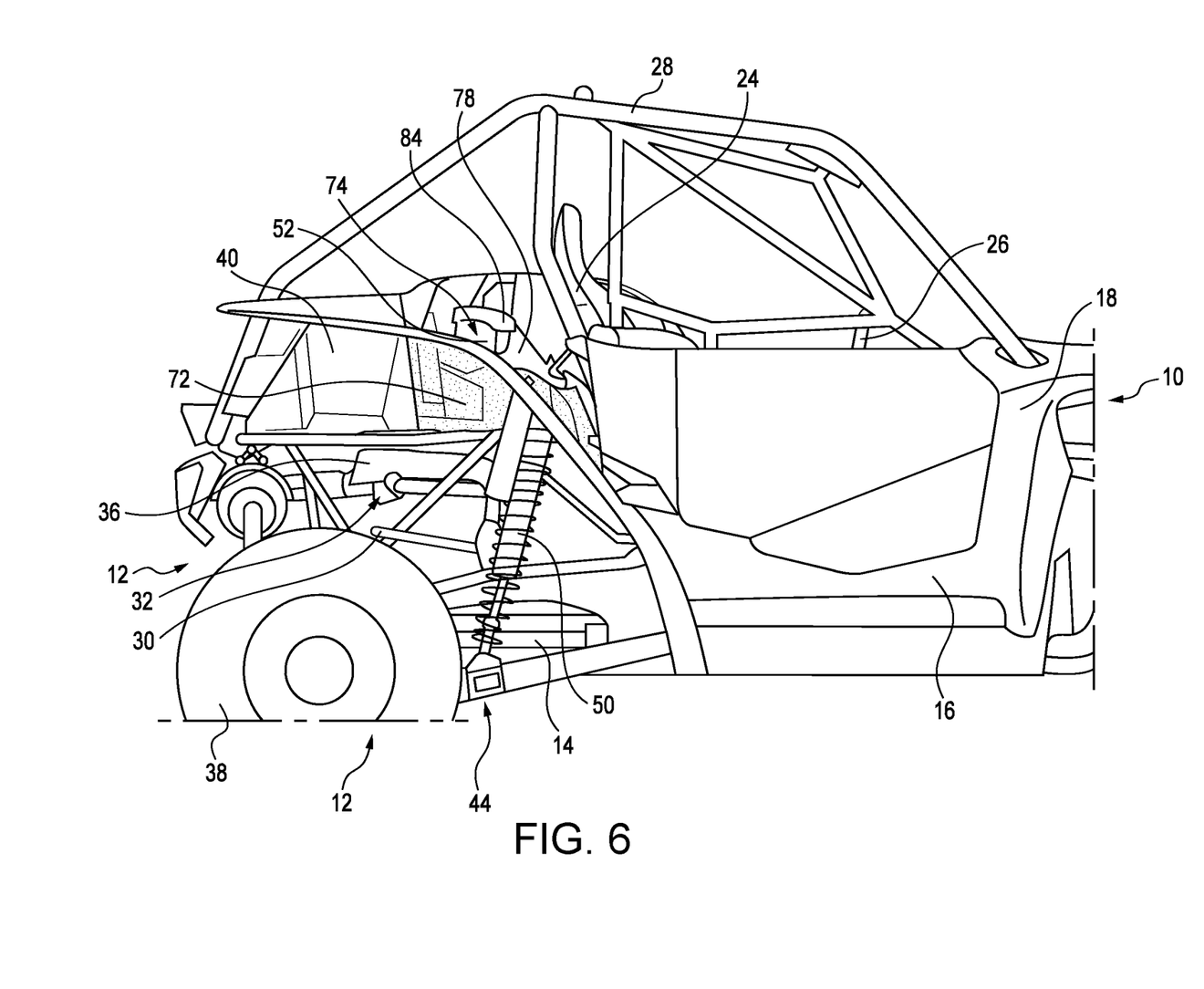
FIG. 6 is a side view of the rear quarter of the motor vehicle with the right rear quarter panel removed.
Figure 7:
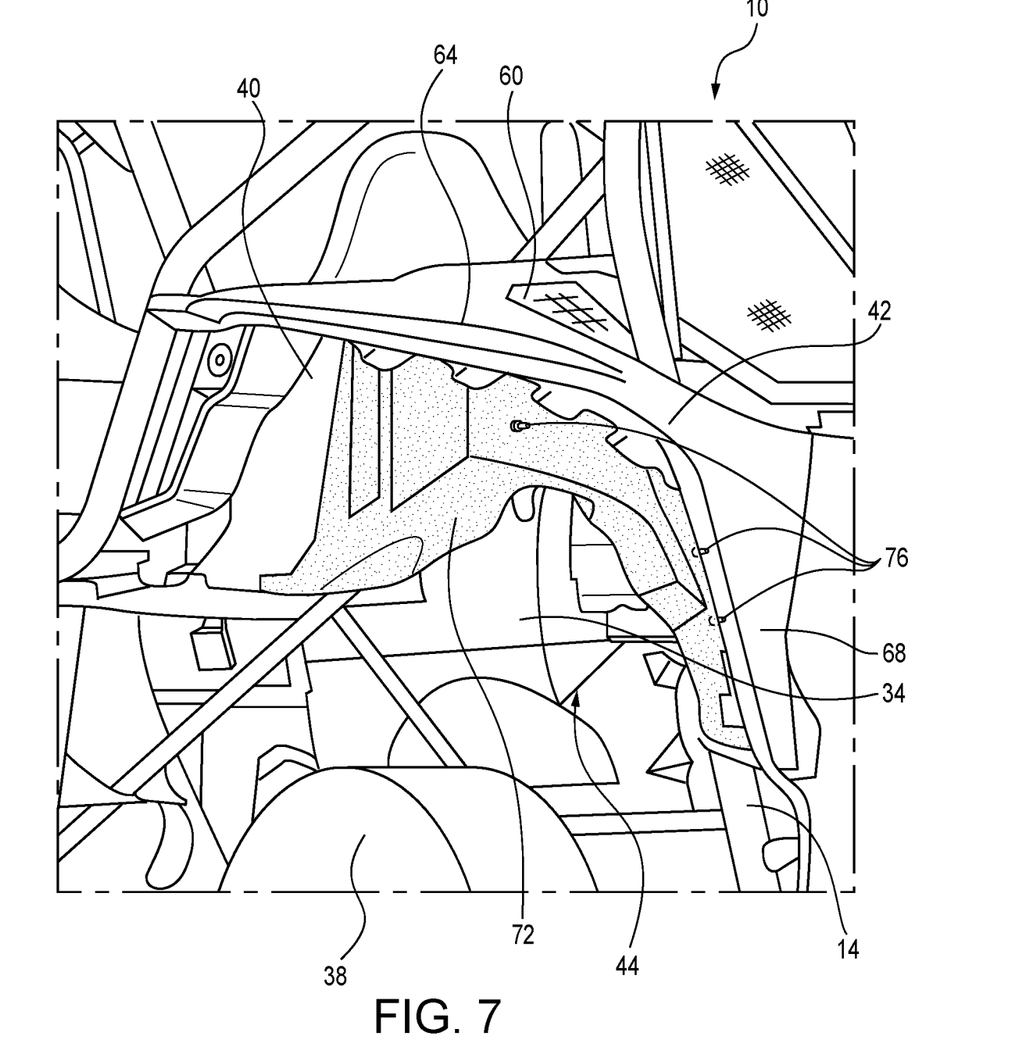
FIG. 7 is a right rear perspective view of the motor vehicle showing the right rear wheel well and the floor of an air intake compartment.
Figure 8:
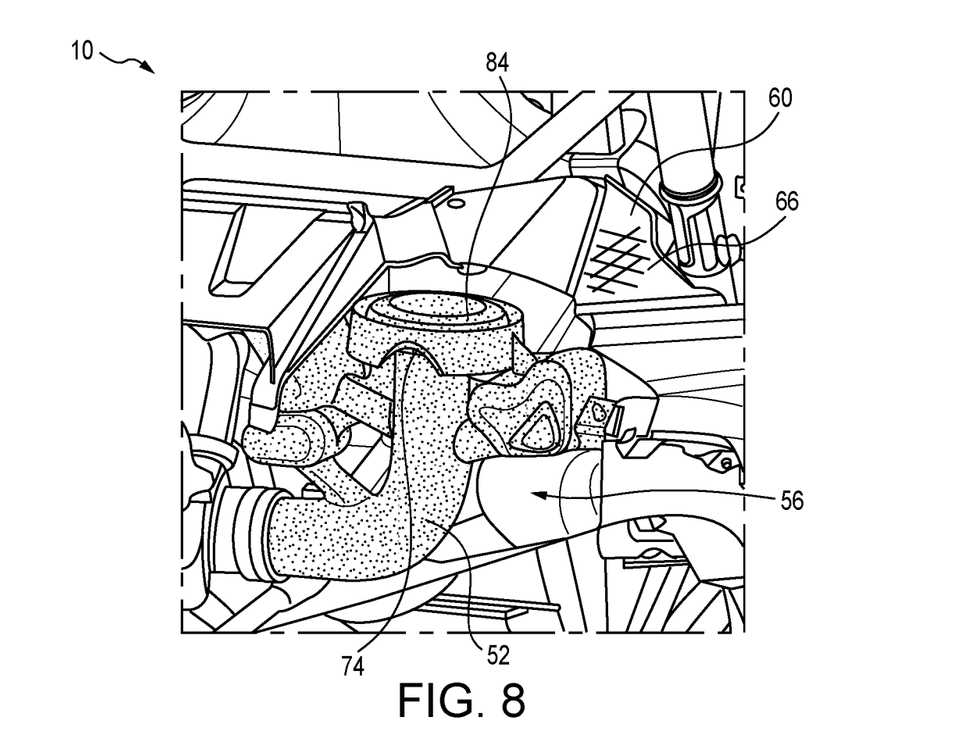
FIG. 8 is a right rear perspective close up view of the air intake compartment of the motor vehicle
Figure 9:
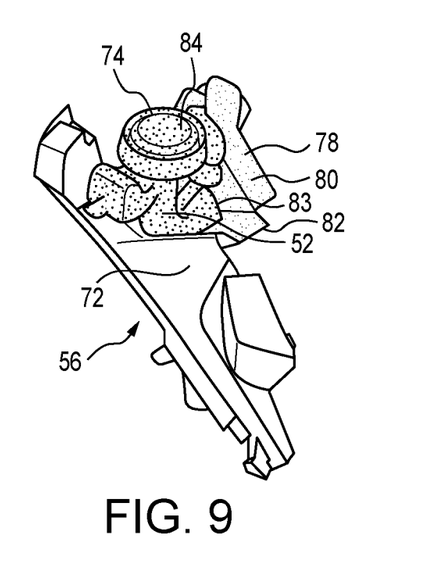
FIG. 9 is a schematic representation of the air intake compartment.
Figure 10:
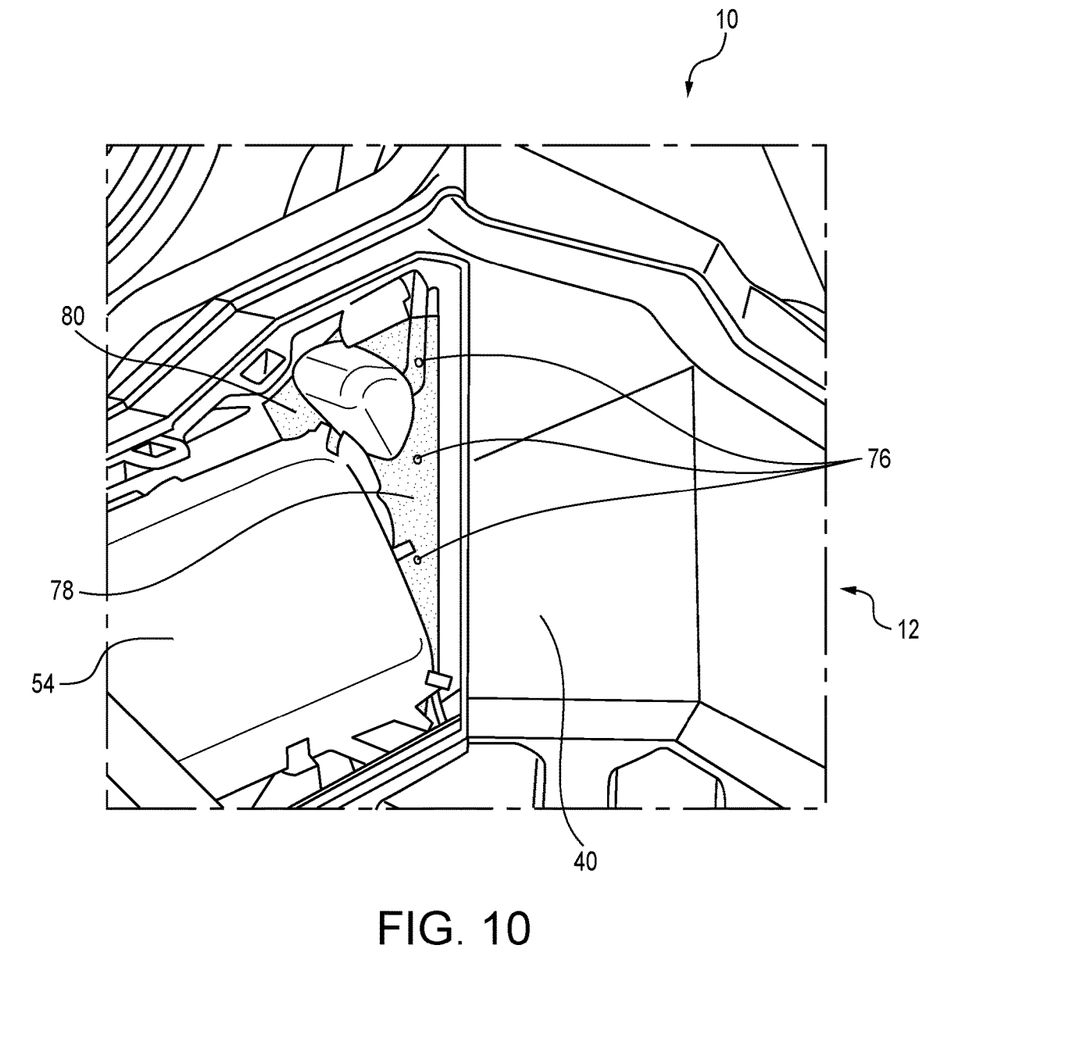
FIG. 10 is a view of the air intake compartment from the engine compartment of the motor vehicle.

FIG. 1 illustrates the rear quarter 12 of a motor vehicle 10, FIG. 2 illustrates a top perspective view of the rear quarter 12 of the motor vehicle 10, and FIG. 3 illustrates a top view of the motor vehicle 10. The motor vehicle 10 illustrated in FIGS. 1-3 is of the type typically described as a side-by-side utility vehicle. The motor vehicle 10 includes a frame 14 and a body 18 on the frame 14. A first portion 16 of the frame 14 and the body 18 defines a passenger cabin 20, which includes a driver seat 22, a passenger seat 24, a steering wheel 26, and a roll cage 28 for protecting the users of the motor vehicle 10. A second portion 30 of the frame 14 and the body 18 defines an engine compartment 32 that is located longitudinally rearward of the passenger cabin 20. A firewall 34 separates the passenger cabin 20 from the engine compartment 32. An engine 36 is attached to the frame 14 in the engine compartment 32. The motor vehicle 10 also includes two rear wheels 38 driven by the engine 36 and two front wheels 39 steerable by a driver sitting in the driver seat 22 by using the steering wheel 26. Finally, the motor vehicle 10 may include a bed 40 located longitudinally rearward of the passenger cabin 20 and vertically above the engine compartment 32. In an alternative embodiment, a second row of passenger seats may replace the bed 40.

The body 18 includes a rear quarter panel 42 that covers a portion of the engine compartment 32 and defines a wheel well 44, which is an open area in the body 18 in which each rear wheel 38 is free to move. In the motor vehicle 10 of the type illustrated, the vehicle suspension system 46, which includes a shock absorber or strut 50, provides for a wide range of motion of the rear wheel 38 to support off-road usage of the motor vehicle 10. Because the motor vehicle 10 is designed to be used off-road, the rear wheels 38 may be generate or kick up dust, dirt, rocks, and other types of the debris in the wheel well 44.

Because the engine 36 of the motor vehicle 10 is located behind the firewall 34 that defines the forward-most portion of the engine compartment 32, there is a need to direct clean, ambient air flow to the engine 36 for purposes of supporting proper air-fuel mixing and combustion within the engine 36. In order to support proper air flow, a snorkel 52 extends from the air cleaner 54 of the engine 36, which cleans and directs air to the engine 36, to an air intake compartment 56 located behind the rear quarter panel 42 of the body 18. In the embodiment illustrated in FIGS. 1-3, the air intake compartment 56 is located behind the right rear quarter panel 42. In an alternate embodiment, the air intake compartment 56 could alternatively be located behind the left rear quarter panel 58.

FIGS. 4-10 illustrate the air intake compartment 56 in greater detail. Within the rear quarter panel 42, there is located a first vent 60 and a second vent 62 for directing the flow of air from outside the vehicle 10 into the air intake compartment 56. The first vent 60 is a trapezoidal shaped vent within an upper portion 64 of the right rear quarter panel 42. A mesh cover 66 prevents the introduction of debris such as rocks, larger chunks of dirt, and the like, into the air intake compartment 56. The second vent 62 is long narrow vent located within a lower portion 68 of the right rear quarter panel 42. The second vent 62 also include a mesh cover 70 to prevent the introduction of debris.

The air intake compartment 56 may also include a molded solid floor 72 that is located behind the right rear quarter panel 42 and beneath the air intake port 74 of the snorkel 52. The floor 72 operates as a solid barrier between the air intake compartment 56 and wheel well 44 to prevent the introduction of dust and debris from the wheels 38, particularly in an off-road setting, into the air intake compartment 56. The floor 72 may be a molded plastic part constructed from a thermoplastic known to those skilled in the art. The floor 72 is attached to the bed 40, to the firewall 34, and to the frame 14, while abutting the right rear quarter panel 42 by any suitable fasteners 76 known to one skilled in the art.

The air intake compartment 56 may also include a flexible member 78 that acts to seal the air intake compartment 56 from the engine compartment 32. The forward portion 80 of the flexible member 78 may be attached to the firewall 34, and a bottom portion 82 may be attached to the frame 14 by any suitable fasteners 76 known to one skilled in the art. The flexible member 78 may also be attached to the bed 40. The flexible member 78 may be made of any suitable flexible material known to one skilled in the art, including, but not limited to, ethylene propylene diene monomer (EPDM) rubber.

The flexible member 78 may include a split 83 allowing the flexible member 78 to wrap around the snorkel 52 to allow the snorkel 52 to pass from the air intake compartment 56 into the engine compartment 32 while maintaining a seal between the air intake compartment 56 and engine compartment 32. The flexible member 78 further may be fixedly attached to the snorkel 52 in an embodiment to further secure the flexible member 78 around the snorkel 52.

The combination of the floor 72 and flexible member 78, taken together in conjunction with the frame 14, firewall 34, and the right rear quarter panel 42, operates to seal off the snorkel 52 from the engine compartment 32 and from the wheel well 44. This combination forces the snorkel 52 to intake air from the outside of the vehicle 10. This helps to provide cleaner air at the snorkel 52 and extends the life of the air filter in the air cleaner 54.

In the embodiment illustrated, the snorkel 52 includes a cap 84 that acts as a pre-filter by creating a serpentine pathway at the air intake port 74 of the snorkel 52, which further acts to further prevent debris, including water, small rocks, dirt, and the like, that is able to pass through the mesh covers 66, 70 of the first and second vents 60, 62 from entering the snorkel 52.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. An air intake system for a motor vehicle, the motor vehicle having a frame, a body on the frame, a first portion of the frame and the body defining a passenger cabin, a second portion of the frame and the body defining an engine compartment longitudinally rearward of the passenger cabin, a firewall separating the passenger cabin and the engine compartment, an engine attached to the frame in the engine compartment, wheels driven by the engine, and a bed located longitudinally rearward of the passenger cabin and vertically above the engine compartment, the air intake system comprising:
   an air intake snorkel for providing air to the engine;
   a first vent in the body for directing air to the air intake snorkel;
   a flexible member installed around the air intake snorkel for isolating the air intake snorkel from the engine compartment; and
   a compartment floor isolating the air intake snorkel from the wheels.

2. The air intake system of claim 1 wherein the flexible member is fixedly attached to the firewall and the bed.

3. The air intake system of claim 1 wherein the flexible member is fixedly attached to the second portion of the frame.

4. The air intake system of claim 1 wherein the compartment floor is fixedly attached to the bed.

5. The air intake system of claim 1 wherein the compartment floor is fixedly attached to the firewall.

6. The air intake system of claim 1 wherein the compartment floor is fixedly attached to the second portion of the frame.

7. The air intake system of claim 1 further comprising:
a second vent in the body for directing air to the air intake snorkel.

8. The air intake system of claim 1 wherein the snorkel further comprises:
a cap.

9. The air intake system of claim 1 wherein the flexible member comprises ethylene propylene diene monomer rubber.

10. An air intake system for a motor vehicle, the motor vehicle having a frame, a body on the frame, a first portion of the frame and the body defining a passenger cabin, a second portion of the frame and the body defining an engine compartment longitudinally rearward of the passenger cabin, a firewall separating the passenger cabin and the engine compartment, an engine attached to the frame in the engine compartment, wheels driven by the engine, and a bed located longitudinally rearward of the passenger cabin and vertically above the engine compartment, the air intake system comprising:

an air intake snorkel for providing air to the engine;
a first vent in the body for directing air to the air intake snorkel;
a second vent in the body for directing air to the air intake snorkel;
a flexible member installed around the air intake snorkel for isolating the air intake snorkel from the engine compartment; and
a compartment floor isolating the air intake snorkel from the wheels.

11. The air intake system of claim 10 wherein the flexible member is fixedly attached to the firewall, to the bed, to the snorkel, and to the second portion of the frame.

12. The air intake system of claim 10 wherein the compartment floor is fixedly attached to the bed, to the firewall, and to the second portion of the frame.

13. The air intake system of claim 10 wherein the snorkel further comprises:
a cap.

14. The air intake system of claim 10 wherein the flexible member comprises ethylene propylene diene monomer rubber.

* * * * *